3,526,032
RIVETING METHOD EMPLOYING METAL FLOW IN BOTH THE MANUFACTURED HEAD AND THE UPSET HEAD
Fred C. Pipher, Burbank, Calif., assignor to Lockheed Aircraft Corporation, Burbank, Calif.
Application July 31, 1967, Ser. No. 657,305, which is a continuation-in-part of application Ser. No. 424,784, Jan. 11, 1965. Divided and this application Feb. 19, 1969, Ser. No. 800,424
Int. Cl. B21d 39/00; B23p 11/00
U.S. Cl. 29—509                                       1 Claim

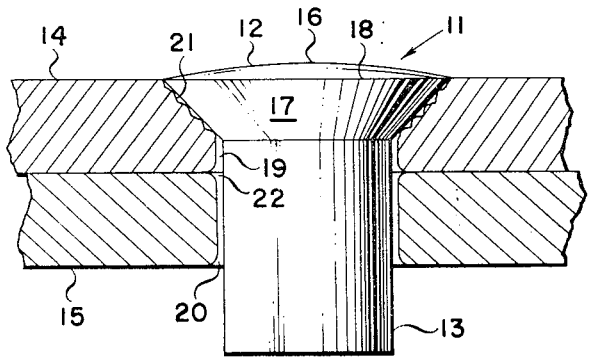
FIG. 1
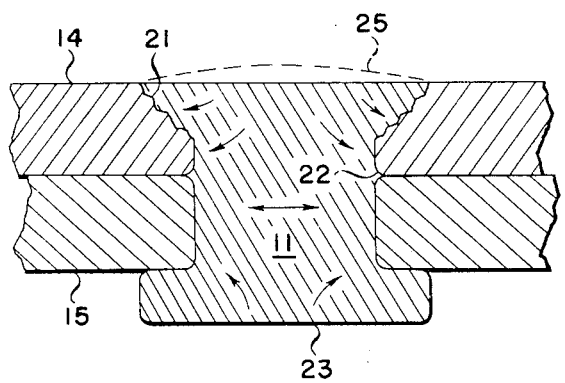
FIG. 2
FIG. 3
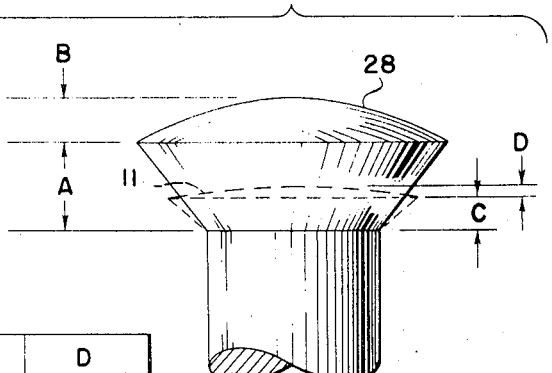
| NOMINAL DIAMETER (INCHES) | A INCHES | B INCHES | C INCHES | D INCHES |
|---|---|---|---|---|
| 1/8 | .062<br>.067 | .031<br>.033 | .021<br>.023 | .004<br>.007 |
| 5/32 | .078<br>.082 | .039<br>.041 | .029<br>.027 | .005<br>.009 |
| 3/16 | .094<br>.096 | .047<br>.048 | .035<br>.033 | .007<br>.011 |
| 1/4 | .125 | .062 | .044<br>.042 | .008<br>.014 |
*INVENTOR.*
FRED C. PIPHER
BY George C. Sullivan
Agent United States Patent Office 3,526,032
Patented Sept. 1, 1970

ABSTRACT OF THE DISCLOSURE

A fastening method employing a rivet having a head with a generally truncated conical undersurface flared uniformly outward from its shank and a convex crown portion which is integral with the rivet head. The rivet, upon being driven, flows into minute cavities or recesses in the countersunk portion of the plate and the convex crown portion of the rivet deforms into a substantially flat configuration which is flush with the external surface of the plate.

CROSS-REFERENCE TO RELATED APPLICATION

This application is a division of application Ser. No. 657,305, filed July 31, 1967, which application is a continuation-in-part of application Ser. No. 424,784, filed Jan. 11, 1965, now abandoned.

BACKGROUND OF THE INVENTION

Field of the invention

This invention relates generally to rivets and more particularly to a rivet of the flush type which is adapted to provide substantially simultaneous metal flow in both the manufactured head and the upset head of the rivet to assure complete filling of various recesses and irregularities in surrounding structures in which the rivet is seated and to assure uniform and adequate joint tightness between the rivet and the sheets or plates into which the rivet extends.

Description of the prior art

In the aircraft industry, structural assemblies such as movable control surfaces, airfoils and the fuselage have been made from aluminum sheets or plates which were assembled and secured by means of small aluminum, one-piece rivets. However, with the advent of high performance aircraft, similar structures are made of thin gage material having a high-strength-to-weight ratio, such as, for example, titanium. Such materials are employed because of the weight saving and temperature requirements.

In such aircraft structural assemblies, particularly where aerodynamic parameters must be considered, the sheets or plates are provided with a multiplicity of countersunk or dimpled holes or recess which receive a standard flush rivet so that the flat head of the rivet, once installed, will remain flush with the external surface of the structural assembly to reduce aerodynamic effects. In a conventional or standard flush rivet, the rivet generally includes a manufactured flat head which is integral with the substantially cylindrical shank or body. The body is adapted to be inserted through registering circular holes in the associated sheets or plates to be joined in such a manner that the end of the shank or body opposite the head is adapted for upsetting or deformation into tight, locking engagement with the overlapping sheet or plate. The manufactured head of such a rivet conventionally has its undersurface flared or tapered outwardly from the shank, producing a conical or oblique surface which is adapted for engagement with a mating countersunk opening or seat in the sheet or plate. In addition, the rivet head is made flush with the outer surface of the plate which is located to thereby provide a smooth and continuous surface which is characterized by very low aerodynamic parastic drag.

The conventional flush rivet just described has been found in practice to be objectionable mainly for the reason that although the deformation of the rivet head material generally fills the countersunk recess in the sheet or plate, the material of the head is not deformed sufficient to close or fill in a large number of minute recesses or irregularities present in the wall of a countersunk hole. Inasmuch as this multiplicity of minute irregularities and recesses are not filled, vibrations encountered during aircraft performance as well as other related effects generally result in a relative movement between the secured plates or sheets and between the rivet head and the countersunk recess, causing galling of the faying surfaces and a significant reduction in fatigue life of the riveted joint. Any joint looseness results in the aforementioned adverse effects, particularly in the use of high temperature and high strength material, such as titanium.

Furthermore, it is extremely difficult to manufacture a flush rivet and a countersunk seat which when mated will provide a rivet head surface perfectly flush with the surface of the plate. Deficiencies are usually encountered which are due, in part, to manufacturing tolerance which results in the rivet head either seating deep into the countersink so that its head surface is below the plate surface or seating high in the countersink so that a portion of the head extends above the plate surface.

In instances where the rivet head is below the plate's surface, the rivet head must be driven out of recess or countersink before there is any material available against which driving tools can be accommodated for applying the ultimate driving forces. The result is either a deeply seated rivet having a large gap or space existing between the top of the rivet head and the plate surface or a gap between the rivet head and the plates to be secured. In either instance, a loose rivet results.

In instances where the rivet head lies above the plate surface, milling operations, subsequent to the driving operation, must be performed to remove excess rivet material and provide a rivet head surface which is flush with the plate's surface. During the milling operation the plate surface often becomes scratched, the full usefulness of the plate being thereby destroyed.

The rivet conventionally referred to as the flush rivet is further objectionable in that the clamping action of the rivet, i.e., the reaction of the rivet in holding together two or more sheets or plates, is not completely utilized in forcing the rivet head against its countersunk seat. Inasmuch as this clamping action is in the nature of a compressive force acting perpendicular to the surface of the plate so as to pull the rivet head against its seat, and since that seat is inclined, only a small portion or component, if any, of this compressive force is exerted perpendicular to the inclined surface of the seat to force the rivet head against the seat. This disadvantage is particularly significant when such a rivet is used in aircraft structures employing relatively thin high-strength-to-weight ratio material such as titanium, columbium or the like, inasmuch as there is substantially no metal flow during deformation of the rivet head into the minute recesses and holes which are present in the countersunk seat.

This problem is accenutated in instances where the driving tool engages the rivet head at an angle relative to the central longitudinal axis of the rivet. Such an offset of the driving tool prevents the compressive forces from being exerted perpendicular to the surface of the plate and the rivet is driven improperly. Inasmuch as this causes little or no deformation of the head in a standard flush rivet, gaps and other irregularities are not closed and a loose rivet installation results.

In addition to the standard flush rivet, the use of a counterusnk buttonhead or countersunk ovalhead rivet has also been found to be objectionable. While both these rivets provide additional material in the rivet head in the shape of a convex crown, the amount of additional material is so great as to be objectionable since the minute irregularities and cavities within the countersunk plate are insufficient in volume to receive the total amount of added material in the head. As a result, after such rivets have been driven, a large amount of residuary material still remains unused. This material, of course, extends beyond the surface of the structure being secured. Consequently, before a flush surface can be obtained, this additional material must be ground or cut away, thereby increasing the amount of time and expenditure required to obtain a flat head configuration which is flush with the outer surface of the countersunk plate. In addition, during these operations the plate surface, as with the standard flush rivet, often becomes scratched and the full usefulness of the plate is sometimes thereby destroyed.

A further disadvantage with countersunk rivets is that the standard angle of the rivet head undersurface is 78°. While this angle will suffice for many applications and usually permits a certain amount of rivet material to flow perpendicular to the surface of the plate, it has been found that an angle approximating 100° will permit greater material flow into the recesses or crevices of the plate countersink without the necessity of extra high driving forces. This larger angle further results in a rivet head which is approximately ⅓ the height of standard buttonhead or ovalhead rivets and permits utilization of a thinner gage material. Since less material is required, a weight saving which is critical to aircraft and spacecraft applications is achieved.

SUMMARY OF THE INVENTION

The rivet of the present invention comprises a shank with a manufactured rivet head formed on one of its ends. The rivet head is of a configuration adapting it to be located such that its peripheral edge is flush with the outer periphery of the countersunk opening of complementary shape provided in the sheet or plate with which it is associated. The manufactured rivet head includes additional rivet material forming a raised portion or crown so that when the rivet is bucked flat the added material flows throughout the head to expand it into and fill the countersink or dimple. A certain portion of this additional material also flows into the shank to fill the locating hole and to assist in upsetting the shank, further assuring a tight fit. The additional rivet head material has a dual flow characteristic. A portion of the material flows perpendicular to the surface of the joined plate. Other flow components radiate from the apex of the crown outwardly through an annular tapered wall defining the rivet head so that the depression, recesses or holes contained in the surface of the plate countersink are completely closed with the deformable rivet material. The additional material in the raised head also serves to fill any gap or space which may initially exist between the top of the rivet head and the plate's surface in the event that improper manufacturing tolerances cause the rivet to set deeper within the countersink than is desirable, thereby providing a truly flush surface in its driven state. Even offset engagement of the driving tool with the raised rivet head causes the described dual flow material deformation, the material flowing into gaps and irregularities. Thus, the driving tool engagement with the rivet head need not be restricted to critical angles or location.

Therefore, it is one of the primary objects of the present invention to provide a flush rivet of novel construction which produces the controllable deformation of a rivet head through the application of compression forces during the installation of the rivet.

Another object of the present invention is to provide an improved flush rivet having a rivet head of a novel shape for configuration whereby the rivet head, upon being driven, is adapted to supply additional rivet material which flows into recesses and minute irregularities present in the wall of the counterbore of the hole and into any recess or irregularity present at the juncture of the mating plate or sheet which is joined by rivet fastener.

A further object of the present invention is the provision of an improved form of flush rivet which includes in its construction means for causing material in the rivet head to be deformed and flow so as to swell and fill the countersink or dimple as well as to flow through the shank of the rivet and fill the locating hole, thereby assuring a tight joint between the two abutting sheets or plates.

Another object of the present invention resides in the employment of a novel raised rivet head having additional material which is deformable upon the application of compressive forces by a set of driving tools regardless of the angle or location of the driving tool with reference to the central longitudinal axis of the rivet during the bucking or driving operation.

Another object of the present invention resides in the employment of a novel rivet head having a uniformly tapered undersurface and a convex crown portion which, when driven into the countersink portion of a plate, results in a flat rivet head flush with the outer surface of the plate.

Another object of the present invention is to provide a rivet having a convex crown, the height of which is approximately ⅓ of conventional buttonhead or ovalhead rivets.

Still another object is to provide a structural joint wherein a plurality of layers of material are secured by a countersunk rivet and wherein the head of such rivet is domed to provide a sufficient amount of additional material to fill any irregularities in the countersink region but be flush with the exterior surface after being driven.

The features of the present invention which are believed to be novel are set forth with particularity in the appended claims. The present invention, both as to its organization and manner of operation, together with further object and advantages thereof, may best be understood by reference to the following description, taken in conjunction with the accompanying drawings.

BRIEF DESCRIPTION OF THE DRAWINGS

FIG. 1 is a partial sectional view of the rivet in accordance with the present invention prior to being bucked or driven to secure together a pair of abutting or overlapping plates;

FIG. 2 is a partial sectional view of the rivet of FIG. 1 after being bucked or driven to secure the pair of plates; and FIG. 3 is an elevational view of a standard countersunk buttonhead rivet with the rivet of the present invention in overlapping relationship and having its head illustrated in phantom and a chart of the comparative dimensions of each.

DESCRIPTION OF THE PREFERRED EMBODIMENT

Referring in detail to the drawings and more particularly to FIGS. 1 and 2 thereof, the present invention is generally designated 11, comprising a head 12 which is integral with a substantially cylindrical body or shank 13 wherein the head and shank are ultimately caused to cooperate to secure together a pair of sheets or plates 14 and 15.

Rivet head 12, as illustrated, is substantially truncated in shape and embodies a raised crown or dome portion 16 and a tapered or truncated conical surface 17 extending from the upper surface of the dome portion 16 to merge with the shank 13. The raised or dome portion 16 includes additional rivet material which extends over and above the upper surface of the plate 14 when the rivet is installed prior to being driven. The additional rivet material contained in the rivet head dome is raised in its center at the highest point on apex A from an annular peripheral edge 18 which defines the major diameter of the rivet head. The height of the raised dome portion 16 is a function of the shank diameter of the rivet 11. A ratio of about .025 to .065 between the dome height and the nominal rivet diameter has been found to give excellent results and produces a rivet head whose height is substantially less than the conventional buttonhead rivet. Also, upon being driven, rivet heads of the above ratio have been bucked to a flat condition and have had no residual material remaining in the dome portion 16; i.e., the head, after driving, has been found to be flush with the plate surface.

In securing the sheets or plates 14 and 15 together, the shank 13 is inserted through registered or aligned circular openings 19 and 20 provided therefor in plates 14 and 15, respectively, until the head 12 is positioned within a recess or seat 21, a tapered countersunk or dimpled enlargement of the entrance to the opening 19. This recess or seat 21 is shaped complementary to the tapered surface 17 of head 12 so as to closely accommodate it. The seat 21 is formed by a conventional counterboring or countersinking operation. It has been found that a counterbore angle of between 90° and 100° permits uniform material flow throughout the entire rivet undersurface when standard rivet driving apparatus is utilized and requires no greater force than that which is used to drive standard rivets.

It is to be noted that the recess or seat 21 displays a plurality of irregularities or holes which are shown somewhat enlarged for illustrative purposes. Some of these irregularities and holes are minute and are generally only observed with the aid of a microscope and through the use of microscopic photography. However, even rather gross irregularities may exist and not be detectable during standard manufacturing procedures. The noted irregularities and holes and failure of rivets to fit exactly within the recesses are found to exist in most mating metal surfaces and are generally accounted for by lack of tolerance control during manufacture of the dimple and mating rivet, a lack of thoroughness in surface finishing techniques, or slight angular variations in the countersunk or dimple recess. In the event these irregularities or holes are not closed by deforming the rivet material, operating loads placed on the plates often result in the generation of excessive vibration or unusual stress which causes the rivet to loosen. This eventually rseults in movement between the abutting plates, galling, a significant reduction in fatigue life of the rivet, and premature failure at the riveted plate.

The addition of rivet material in the form of the raised or domed rivet head in the aforementioned ratio provides material sufficient for flowing into the described irregularities and holes when the rivet is driven but does not result in excess residuary material, requiring removal. Furthermore, this amount of material is sufficient to fill the slight irregularity usually found in the circular openings 19 and 20 due to the abutment of the plates 14 and 15. Such openings generally define minute annular recesses such as illustrated at 22 in the composite bore located at the point of contact between the mated surfaces of the pair of plates.

Although aluminum, steel and other metals and alloys may be employed in fabricating the rivet of this invention, it has been found that the rivet is particularly useful when made of a material having a high-strength-to-weight ratio, for example, metals such as titanium, columbium or the like. During driving, the malleable nature of the rivet 11 permits deformation or flow of the material of the head 12 substantially as shown in FIG. 2, whereby this material is forced or pressed into very tight contact with the sides of the openings 19 and 20 and the recess or seat 21 in the plate 14. The deformation of the upper and mid portions of the shank 13 result in a similarly firm contact between the material of the shank 13 and the sides of the opening 19 and 20 in the sheets 14 and 15, as well as closing the annular recess 22. It is apparent that with respect to the sheet 14, the head 12 is virtually immovable since in the driving operation the material thereof becomes, in effect, integrated by movement into extremely intimate contact with the sheet 14. Simultaneous with the affixing of the head 12 in its recess 21, the projecting lower end of the shank 13 is formed by the driving operation into a flattened or upset portion 23 which, in combination with the head 12, fixedly and tightly secures the plates 14 and 15 together. The described intimate association effected between the driven rivet 11 and the plates 14 and 15 results in a rigid, tight joint capable of withstanding great stress and vibration.

In FIG. 2, the additional rivet material forming the crown or dome portion 16 of the rivet head 12 is shown as having been displaced or flowed throughout the rivet 11, in the general directions of the plurality of arrows. Dotted line 25 illustrates the outline of the dome portion 16 prior to the driving of the rivet. It should be noted that the direction of the material flow is controlled by the configuration of the raised rivet head in such a manner that additinal material in the dome portion 16 flows or causes rivet head material flow to radiate generally outward from the apex A of the dome in vectored or oblique directions. This is contrasted to the flow of material perpendicular to the upper surface of the rivet in conventional flat head rivets.

As also shown in FIG. 2, since the device of the present invention contains only enough excess material in the dome of the rivet head to fill the void and irregularities under the head as well as adjacent rivet shank, the head of the rivet, after being driven, is flush with the upper surface of the plate 14 so that no further milling or cutting operation is required to achieve a smooth, flat, continuous surface. The rivet, when driven tight, remains tight under excessive stress loading conditions as well as under excessive vibration. Where conventional rivets of a given size withstood only approximately 70,000 to 80,000 tension cycles at the rate of 15 cycles per second under test conditions, test samples incorporating rivets of the present invention in comparable sizes withstood 212,000 to 270,000 cycles and above.

Referring now more specifically to FIG. 3, a standard countersunk buttonhead rivet 28 is shown with the rivet 11 of the present invention in overlapping relation. A chart listing the various heights and diameters of each is included for comparative purposes. It should be specifically noted that the rivet head 12 of the present invention contemplates utilization of a head which is of considerably shorter height than the standard buttonhead rivet. This reduction in height becomes highly important when utilizing high-strength-to-weight ratio materials such as titanium, or the like, since the thickness of the material with its resulting weight is critical in the fabrication of aircraft and spacecraft. Consequently, to use the standard countersunk buttonhead rivet 28 would require the use of a sheet of three to five times the thickness acceptable in use with the presently described and claimed rivet. Additionally, the ratio of the height of the dome portion 16 to the nominal diameter of the rivet 11 is between .025 and .065, the preferred range being .023 to .058. This is compared with a four to eight times greater ratio for the buttonhead rivet 28. The greater taper angle on the rivet surface 17 further permits a tighter engagement than with the standard buttonhead rivet 28 because of the larger resultant driving force components perpendicular to the recess 21 with the resulting advantage that a lighter, thinner, less costly and shorter rivet may be used to obtain the same or greater structural integrity as previously achieved by such rivets. In this regard, it has been found that a rivet having a taper within the range of 90° to 110° (as compared with the standard 78° buttonhead undersurface) also eliminates any razor-sharp edges (the distance between the surface of sheet 14 adjacent sheet 15 and the bottom of the recess 21) common to many of the conventional rivets, thereby creating less susceptibility to cyclic fatigue. A preferred range for this angle is 95° to 105°.

Consequently, when the crown of the rivet of the present invention has been driven flat so that the rivet head 12 is flush wth the surface of the plate 14, tests have shown that there has been a tightening of rivet all the way around the rivet seat and shank locating bore. Even offset engagement of the driving tool from the center of the rivet deforms the rivet material included in the raised portion 16 whereas offset driving of the conventional flat head rivet causes the flat head to cock to one side. Studies made concerning the standard countersunk buttonhead rivet 28 show that the flush condition obtainable with the rivet 11 cannot be duplicated in driving the rivet 28. This results from the fact that the amount of added material in the buttonhead rivet crown is so much greater than the volume of the recesses of the conventionally machined counterbored plate that a large residue of material remains. Thus, subsequent machining, grinding or cutting operations to make the rivet head flush with the outer surface of the countersunk plate 14 are required, thereby increasing the cost of fabrication.

While certain preferred embodiments of the invention have been specifically disclosed, it is understood that the invention is not limited thereto. Its many variations will be readily apparent to those skilled in the art and the invention is to be given its broadest possible interpretation.

I claim:
1. The method of joining a plurality of substantially planar structural members comprising the steps of:

forming a uniformly flared countersunk opening in one of said planar members, the angle of said countersink being in the range of 90 degrees to 110 degrees;

forming axially aligned circular openings of a given diameter in the remainder of said members in registration with said countersunk opening;

first inserting the butt end of a rivet through said registered openings, the portions of said rivet confronting said members being of complementary shape therewith, said rivet being provided with a convex crown the height of the apex of which extends above the plane of the periphery of said countersunk opening by a distance greater than 0.025 and less than 0.065 times said given diameter;

thereafter deforming said crown in response to an applied compressive force to the extent that metal in said crown flows downwardly and outwardly so that the entire exposed surface of said crown is made substantially flush with respect to the plane of the periphery of said countersunk opening; and deforming said butt end simultaneously with said crown deforming step to cause radial flow of metal in said butt end and expansion of said rivet to a degree sufficient to substantially fill said openings and produce a void-free joint at the interface between said rivet and said members.

References Cited

UNITED STATES PATENTS

| | | |
|---|---|---|
| 2,147,763 | 2/1939 | Becker. |
| 2,233,820 | 3/1941 | Pavlecka _____ 85—37 X |
| 2,237,338 | 4/1941 | Dale _____ 85—37 |
| 2,245,933 | 6/1941 | Moore _____ 85—37 |

FOREIGN PATENTS

| | | |
|---|---|---|
| 707,103 | 6/1941 | Germany. |

CHARLIE T. MOON, Primary Examiner

U.S. Cl. X.R.

29—522, 526; 85—37; 287—189.36